United States Patent [19]
Ryall

[11] Patent Number: 4,863,606
[45] Date of Patent: Sep. 5, 1989

[54] WASTE WATER TREATING PROCESS

[76] Inventor: Ronald W. Ryall, 505 Hillside Ter., Vista, Calif. 92083

[21] Appl. No.: 131,821

[22] Filed: Dec. 11, 1987

[51] Int. Cl.$^4$ ............................................... C02F 3/10
[52] U.S. Cl. ................................. 210/605; 210/616; 210/150; 261/DIG. 72
[58] Field of Search .................. 210/150, 151, 221.2, 210/605, 521, 617, 618, 616, 207, 603; 261/DIG. 72

[56] References Cited

U.S. PATENT DOCUMENTS

| | | | |
|---|---|---|---|
| 699,345 | 5/1902 | Provost, Jr. | 210/605 |
| 3,543,937 | 12/1970 | Choun | 210/150 |
| 4,415,454 | 11/1983 | Fuchs | 210/616 |
| 4,440,645 | 4/1984 | Kite | 210/626 |
| 4,477,344 | 10/1984 | Olszewski et al. | 210/207 |
| 4,479,876 | 10/1984 | Fuchs | 210/605 |

*Primary Examiner*—Benoit Castel
*Attorney, Agent, or Firm*—Whann & Connors

[57] ABSTRACT

Disclosed is a process for treating waste water containing high levels of organic waste products which employs a series of chambers through which the water flows with the upstream chambers promoting anaerobic digestion of the waste products and the downstream chambers promoting aerobic digestion of the waste products. The upstream chambers are charged with a sludge preferably which, because of the conditions maintained within the chamber, has an ash-like characteristic upon being dried and does not contain high levels of water included within it. It is sometimes desirable to recharge the chamber with sludge since this sludge acts as a buffer that can digest shock loads of waste products having a high chemical oxygen demand. The chambers include water circulators which stir the water within the chambers and the downstream chambers having floating on the water surface high surface area media which carries bacteria. Preferably the water flows through the downstream aerobic chamber in a carousel-like fashion.

4 Claims, 2 Drawing Sheets

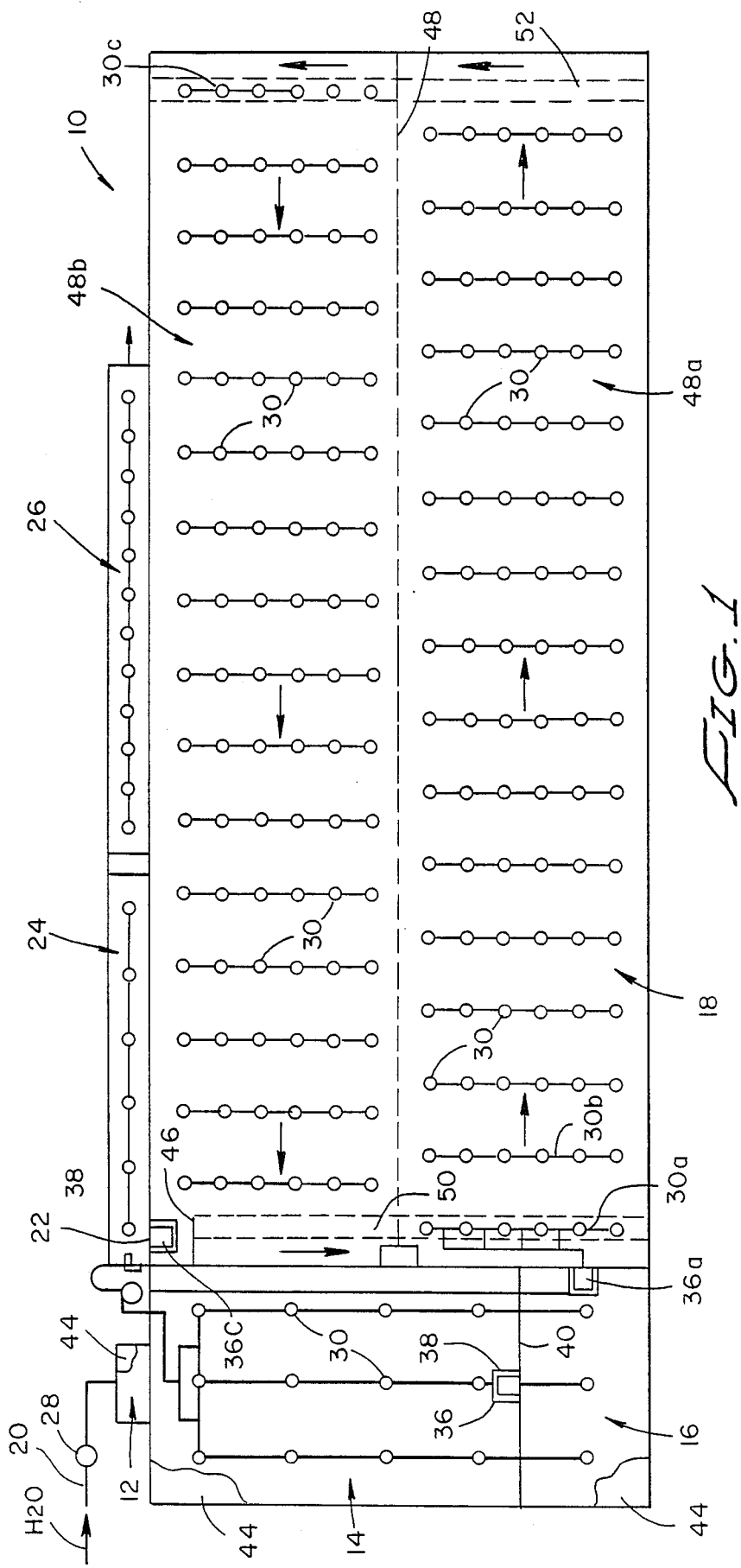
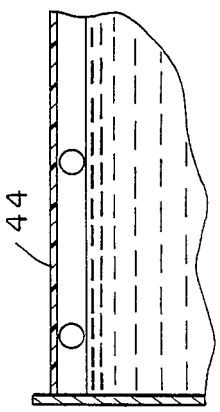
FIG. 1
FIG. 5

WASTE WATER TREATING PROCESS

BACKGROUND OF THE INVENTION

1. Field of the Invention

This invention relates to a process for treating waste water, and particularly to a process which avoids formation of a water laden sludge as a by-product of the process.

2. Background Discussion

Sewage waste water contains various chemicals and organic compounds which must be reduced or eliminated prior to mixing with the nation's water resources. Typically, such waste water is treated in sewage plants using either the activated sludge process or the trickling filter process. In both of these processes bacteria grows on a media and this bacteria biochemically digests the contaminants in the water. In treating waste water it is the objective (1) to use gravity to the maximum extent possible in order to avoid pumping the water which requires the use of large amounts of energy, (2) to introduce oxygen into the system in order to support the continued growth of the bacteria, and (3) to accomplish treatment within the minimum amount of space so that available land is put to its best possible use.

MAJOR FEATURES OF THE INVENTION

The present invention provides a waste water treatment process which conserves energy, handles waste water highly laden with pollutants, minimizes maintenance, facilitates handling sludge, and minimizes land usage.

Briefly, the process of this invention comprises digestion of pollutants in waste water by contact with microorganisms carried on floating or suspended media and achieving substantially enhanced contact using the gas-water circulator described in U.S. Pat. No. 4,707,308, entitled Apparatus for Circulating Water, and incorporated herein and made part of this application by reference. Such circulators shall hereafter be referred to as the Ryall Circulators. In accordance with this invention, contact with the microorganism, such as bacteria, and water occurs under anaerobic conditions and then under aerobic conditions. Using the process of this invention where the primary treatment occurs in an anaerobic environment, substantial reduction in chemical oxygen demand (COD) is achieved. For example, typical untreated sewage waste water has a COD of 500-600 milligrams per liter (mg/1). In conventional systems, primary treatment reduces the COD about 40%, or to a level where the COD of the water from the primary treatment is 300-360 mg/1. In the process of this invention, primary treatment under anaerobic conditions results in COD levels of about 150-200 mg/1. Thus, the COD for the subsequent aerobic treatment is reduced.

There are several features of this invention, no single one of which is solely responsible for its desirable attributes. Without limiting the scope of this invention, as expressed by the claims, its more prominent features will now be discussed briefly. After considering this discussion, and particularly after reading the section of the patent application entitled DETAILED DESCRIPTION OF THE PREFERRED EMBODIMENT, one will understand how the features of this invention provide an energy efficient, relatively chemically shock proof waste water treating process which avoids producing large quantities of water laden sludge.

The first feature of this invention is the use of two anaerobic chambers containing Ryall Circulators. The first anaerobic chamber retains solid waste material which upon aging is digested into a low volume, odor free, solid that dewaters relatively quickly because it has essentially no bonded water. Typically, the original sludge volume is reduced by 85% in 90 days. Experimental results indicate that the average sludge volume is 17% of the volume of the undigested sludge that would have accumulated in a period of one year. The organic component of the solid waste material is reduced to ash by the long solids retention time. For example, the undigested volume of organic sludge in a one million gallon per day through-put system is typically about 8-20 cubic feet per day. A 50,000 cubic foot chamber would have a solid retention time of over two years. Thus, sludge volume is dramatically reduced in the process of this invention.

The second feature of this invention is the separation of solids from the water flowing from the first anaerobic chamber into the second anaerobic chamber. A conventional lamellae chamber is used to achieve this separation. Thus, essentially all the solid waste materials are trapped in the first chamber. These solids include both solid wastes in the influent stream and an initial charge of sludge from another sewage treatment plant. The initial precharge provides a population of microorganisms for the process and an active surface to which the microorganisms attach themselves. The incoming solid waste is rapidly mixed with the precharged sludge under the forced stirring of the Ryall Circulators to provide for intimate contact with the microorganisms. Thus, rapid digestion is accomplished.

The third feature of this invention is subjecting the waste water to aerobic treatment after anaerobic treatment. This is accomplished in a downstream chamber which also contains Ryall Circulators to achieve intimate contact between the microorganisms and the dissolved contaminants The fourth feature of this invention is the use of floating or suspended media which carry the bulk of the microorganisms. The preferred floating media is a plastic ball having an open structure providing a high surface area to volume ratio in excess of 35 square feet per cubic foot, a specific gravity of 1.0 or less, and a void volume in excess of 90%. Typically, the ball will have a diameter of about 1.5 to about 5.5 inches, preferably 3.0 to 4.0 inches. The balls cover essentially the entire surface area of both the second anaerobic chamber and the downstream aerobic chamber. Some are drawn beneath the water's surface under the influence of undertow currents generated by the Ryall Circulators. Optionally, floating media may be used in the first anaerobic chamber.

The fifth feature of this invention is the sizing of the first anaerobic chamber. It is designed to hold a sufficient volume of water to dilute the influent stream to prevent upset by shock overloads of contaminants. Thus, if there is a shock load of chemicals in the influent stream, this stream is diluted substantially so that there is adequate time to digest the shock load as it flows through the first chamber. Moreover, because the first chamber is maintained essentially under anaerobic conditions, the microorganisms growing under these conditions have the ability to metabolize shock loads without an increase in oxygen demand. In fact, their metabolic rate appears to increase as waste product concentration increases.

The sixth feature of this invention is the selective generation of methane to provide energy for water circulation by control of the methanogenic microorganism population. In small plants where economics mitigate against the use of methane as an energy source for the process the methanogenic microorganism population is supressed. By introducing microscopic amounts of oxygen into the first anaerobic chamber the methane producing activity of the methanogenic microorganisms is inhibited. In larger plants where the economics justify methane production, such microscopic quantities of oxygen are not added. Experimentation shows that high quality gas containing 60% methane by volume can be produced under ambient temperature conditions. This gas may be used as the fuel to provide power for the Ryall Circulators.

The seventh feature of this invention is the use of the Ryall Circulators. Each circulator, in conjunction with the floating media, creates a hydraulic biofilter cell. The waste water is forced through the media by the circulators with the circulators being arranged in rows and the rows forming a matrix of biofilter cells. The water flows from one biofilter cell to another. The turnover time of the water within each cell is about five minutes, with each cell covering a surface area of about 25 to about 36 square feet (approximately 5–6 feet square and 6–8 feet deep). The floating media is contacted many hundreds of times in the course of the water flowing through a cell.

The eighth feature of this invention is controlling the operation of the pumps for the Ryall Circulators as oxygen demand increases. For example, one pump will operate one row of Ryall Circulators and another pump will operate a second row of Ryall Circulators. A monitor checks the oxygen demand of the water. If one pump is operational, a second pump is turned on when the chemical oxygen demand reaches 2.0 to thereby operate the second row of Ryall Circulators.

BRIEF DESCRIPTION OF THE DRAWING

The drawing, in which like numerals indicate like parts, discloses the preferred embodiment of this invention, in which:

FIG. 1 is a schematic view looking down on a waste water plant utilizing the present invention.

DETAILED DESCRIPTION OF THE PREFERRED EMBODIMENT

Figure 3:
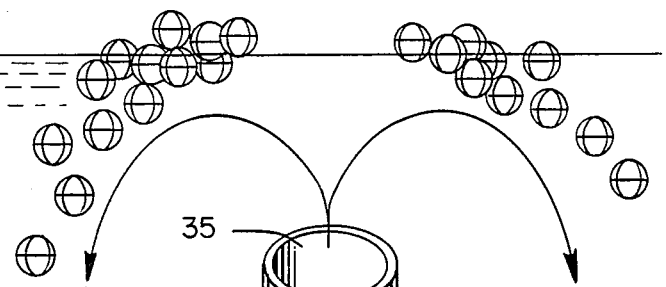
FIG. 3 is a perspective view of one of the circulators used in the present invention.

As shown in FIGS. 1 through 4, the waste water treatment plant 10 utilizing the process of this invention includes four separate treatment chambers 12, 14, 16 and 18. The waste water enters the plant 10 at the inlet end 20 and flows sequentially through the four chambers 12, 14, 16 and 18 and out the effluent end 22, where it passes through a post treatment section as required for disposal. For example, a multi-media filter 24, followed by a disinfection chamber 26 may be used. After being disinfected, it is returned to the environment.

On entering the plant 10 the waste water passes through a conventional macerator 28 which grinds up any solid materials in the water into smaller particulates. Upon leaving the macerator 28, the water with these solid particulates in it passes into the first chamber 12 which serves as a settling chamber. In the first chamber 12 the large solid metal and grit particulates settle on the bottom of this chamber and separate from the water. The water enters the first chamber at the bottom and flows upwardly and out the chamber over a weir (not shown) which separates the first chamber from the second chamber. The velocity of the rising water flowing through the first chamber 12 is less than the velocity of the large, falling particulates. The first chamber has a V-shape, with a water jet (not shown) at the bite of the V. This water jet prevents packing of the solids in the chamber and washes organic material off the surface of the solids. The organic solids float over the weir into the second chamber 14.

The second chamber 14 has a volume which is substantially larger than the first chamber. Within this chamber 14 are a number of Ryall Circulators 30 of the type shown in FIG. 3. These circulators 30 are also used in the other chambers 16 and 18. They are designed to pump the atmosphere above any chamber through an aspirator 32 that is located inside an inductor 34. Water is introduced into the inlet of the inductor 34 and drawn upward and out of its outlet 34a. The inductor 34 includes a wall defining between said inlet and outlet a restricted segment 27. The inductor 34 is submerged in the body of water with the inlet 29 below the surface of the water. The aspirator 32 is disposed below the restricted segment at the inlet of the inductor 34 and centrally positioned and spaced from the wall. The aspirator 32 has a water inlet 31, inlet 33 in communication with the atmosphere, and an outlet 35. The water inlet, gas inlet, and outlet of the aspirator are disposed below the restricted segment. A pump connected to the water inlet of the aspirator 32 pumps water from the body of water into the aspirator 32 through the water inlet 31, so gas is drawn into the air inlet 33 and a mixture of atmospheric gas and water flows from the aspirator outlet upwardly towards the restricted segment. The mixture of atmospheric gas and water is in the form of a confined cone which at a predetermined point from the outlet of the aspirator begins to break apart. The aspirator 32 is positioned relative to the restricted segment so that the point where the cone begins to break apart is at or near the restricted segment. The cross-sectional area of the cone taken at a right angle through the longitudinal axis of the cone at the point where the cone begins to break apart approximately equals the cross-sectional area of the restricted segment. This provides a substantial increase in the amount of gas introduced into the water and also enables large volumes of water to be circulated with a minimum usage of energy. The features of this circulator are discussed in detail in U.S. Pat. No. 4,707,308, referred to above.

In accordance with this invention, there will be substantial dilution of the water from the settling chamber 12 upon flash mixing by the Ryall Circulators with the water in the second chamber 14. For example, if a hydraulic retention time of two hours would be an adequate holding period for the water in the chamber 14, this chamber 14 is designed to hold the water at least four times longer, i.e., 8 hours. This is important because it is possible, and frequently occurs, that the influent water will contain large quantities of pollution having a high (COD). A high level of dilution occurs consistently throughout the plant 10 as water flows from one chamber to the other.

Two processes occur simultaneously in the second chamber 14 to treat the waste water. One is sedimentation of suspended solids onto the bottom of the chamber. The other is anaerobic digestion of waste material. In accordance with one feature of this invention, the chamber 14 is initially charged with a sludge from a sewage plant. This sludge will contain high levels of bacteria which will digest the organic solids in the water and break down large organic molecules. Conditions are controlled so that the majority of the bacteria population digest waste anaerobically to produce either carbon dioxide by-product gas or a mixture of carbon dioxide gas and methane. Methane will be produced if it can be economically utilized as a source of energy. The bacteria is aged, so that it has many different species adapted to treat a wide variety of organic wastes. This sludge has a high surface area, has an ash-like consistency when dry, and does not occlude water. This ash-like sludge is developed after about ninety days of aging and it does not hold water to itself. Thus, it is easy to dewater.

Figure 2:
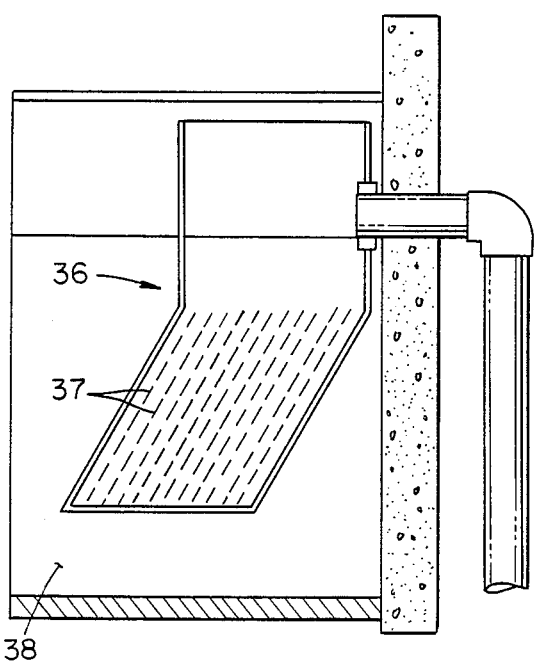
FIG. 2 is a side-elevational view showing the lamellae section.

The water from the second chamber 14 flows into the third chamber 16 through a quiet zone which is provided by a lamellae chamber 36 such as shown in FIG. 2. The chamber 36 provides a series of plates which are disposed at an acute angle, with the water flowing from the bottom of the chamber upwardly. The solids collect on the surface of the plates and slide under the force of gravity over these surfaces to the bottom of the chamber. A flexible stilling curtain 38 surrounds the chamber 36 to form a quiet zone within the curtain that segregates the confined water from the turbulent environment surrounding it due to the agitation produced in the chamber 14 by the circulators 30. Another stilling curtain 40 separates the second chamber 14 from the third chamber 16. The water flowing from the second chamber 14 has less than 30 ppm solids.

Figure 4:
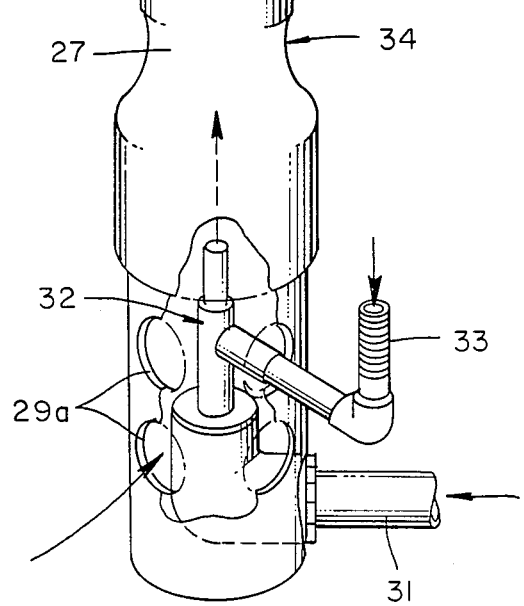
FIG. 4 is a perspective view of one of the floating media.
Figure 4:
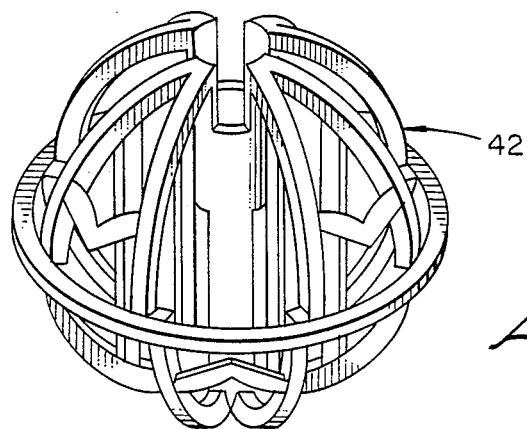

The third chamber 16 also includes a plurality of circulators 30 which continually circulate the water in this chamber. This chamber 16 also includes floating porous media 42 which have a high surface area on which bacteria grow. FIG. 4 illustrates a typical floating media, which is a plastic ball having a high void volume. Such a ball is made by the Jaeger Corporation of Fountain Valley, Calif. Typically, these balls have a specific gravity of about 1.0, a diameter ranging from 1.5 to about 4.5 inches and a void volume of in excess of 90%. At the side of the third chamber is a second lamellae chamber 36a, similar to lamellae chamber 36, which provides a passageway for water flowing from the third chamber 16 into the fourth chamber 18.

In accordance with one of the principal features of this invention, the first, second and third chambers, 12, 14 and 16, respectively, are covered with a plastic sheet 44 mounted on floats 41 (FIG. 5) which float on the surface of the water in these three chambers. The floats 41 provide a gap between the surface of the water and the plastic sheet 44 to form a closed atmospheric chamber above the water surface in these three chambers. The plastic sheet is reinforced with nylon fibers, is black in color to absorb heat from the sun, and is tough enough to walk on. As mentioned above, the conditions within these three chambers maintain the anaerobic growth of bacteria which, for smaller plants, produce carbon dioxide. Thus the atmosphere immediately above the surface of the water in these three chambers is approximately 60-70% carbon dioxide, with the balance being air gases. There is a vent (not shown) in the cover to permit gas to escape so that excessive pressure is not built up.

In accordance with an optional feature of this invention, a slipstream 46 of water from the fourth chamber 18 is introduced into the second chamber 14. This slipstream 46 contains trace amounts of oxygen to suppress the growth of methanogenic bacteria within chamber 14. This incidentally promotes the growth of bacteria which digest fats and oils. If the waste water contains large quantities of fats and oils, the amount of oxygen will be increased. Periodically, the chambers 14 and 16 are inspected. If large scum levels are present, the oxygen level is increased.

The anaerobic environment maintained within the chambers 14 and 16 is believed primarily responsible for producing the ash-like sludge. This sludge is relatively low in volume, ordinarily only occupying about 5 percent by volume of the chamber, and does not incorporate within its structure chelated water. This sludge is composed of relatively large particulates which settle rapidly on the bottoms of chambers 14 and 16 when the circulators 30 are turned off. The density of the sludge is about 70 lbs/cubic foot. This is in contrast to the conventional processes which generate large volumes of very fine particulate sludge which remains suspended in the water, retains water, and must be periodically removed from the plant and allowed to dry out and be hauled away to a dump. The chambers of the present invention do not become clogged with sludge and do not need to be cleaned, except periodically to remove indigestible material such as cigarette filters and the like. The avoidance of a large volume of sludge is thus a characteristic of this invention.

The water upon leaving the third chamber 16 flows into the fourth chamber 18 which contains the largest volume of water. The conditions of the fourth chamber are maintained to promote the growth of aerobic bacteria. Consequently, this fourth chamber 18 is open to the earth's atmosphere, allowing oxygen to be readily mixed with the water in this chamber. The floating media 42 are also in this chamber 18 on which bacteria grow.

The design of the fourth chamber is unique. It includes a septum 48 which divides it into two generally equal sections 48a and 48b, with the water flowing from section 48a into section 48b and then recycling back again. There are a plurality of rows of circulators 30 aligned in sequence with different rows identified as 1, 2, 3 or 4. The numbers 1, 2, 3 and 4 indicate that four different, dedicated pumps (not shown) are used to provide power to the rows of circulators. When pump 1 is turned on all the circulators for each row 1 will be operational. An oxygen demand monitor such as one made by the Leeds Northrope Corporation having a permanent type membrane is used to check the chemical oxygen, and when it reads less than 2.0, more pumps are turned on. For example, if pumps for rows 1 and 2 are operational and the oxygen demand increases to above 2.0 the pump for rows 3 is turned on. This arrangement of the circulators 30 in the fourth chamber 18 provides a unique flow pattern for the water. First it moves past bank 30a in an upwardly direction, then from that out of the top of the row of circulators 30, then it is drawn downwardly into the lower portion of the next bank 30b of the circulators and up again, moving up and down through the rows of circulators 30 as it flows thru section 48a. When it reaches the end of section 48a, into a tunnel 52 that moves the water from 48a into the first bank 30c of circulators in section 48b. Again the water flows up and down as it moves from end of section 48b to the other end of section When it reaches the effluent end of section 48b of the water is then circulated through a tunnel 50 into section 48a, with a portion of the water being di a lamellae chamber 36c, into the multi-media filter and thence to the disinfection chamber 26. The bulk of water circulates in a circular fashion between 48a and 48b in a stream that simultaneously moves and down. This flow is thus similar to a carousel.

One of the main features of this 10 is that the circulators 30 use less energy than co pumps, and not all need to be operated simultaneously. At high loads, all the circulators will be on. Other times during low loads, only some of the circuit s 30 are operating. Thus, to achieve the between the bacteria adhering to the floating me 42 and the waste water, only minimal energy is employed.

OPERATION OF THE PROCESS

The waste water to be treated the plant 10, first flowing into chamber 12 where heavy are removed and then into chamber 14 containing the After aging of about 90 days the typical sludge a sewage plant and used to charge the chamber 14 have a substantially reduced volume. Because o nature of the sludge produced in an anaerobic and aging thereof, the removed sludge is easy de Thus, achieving more economic use of land and ease of sludge handling.

The anaerobic conditions within the first three chambers 12, 14 and 16 produce a population of bacteria that increases in metabolic activity as the contamination level rises without the need for oxygen. Consequently, shock loads do not upset the plant 10. When a very high level of contamination enters the chambers 12, 14 and 16, the metabolic rates of the bacteria in these three chambers increases to digest the contaminants.

The floating media 42 in both chambers 16 and 18 serve as a site to which the bacteria adhere. The bacteria grow on these as dendrite-like structures which break off from time to time. These will be digested also. The circulators 30, constantly churning the water in the chambers 16 and 18, achieve excellent contact between the atmosphere, the bacteria and water to provide for rapid digestion of the contaminants within hydraulic biofilter cells formed around each circulator. Because the circulators 30 are very efficient, substantially less energy is used than conventional waste water treatment facilities The water entering the plant 10 is generally acidic, having a ph of about 5-5.5. The water in chamber 16 is about ph 7.5. It is in this chamber 16 that methane generating bacteria tend to grow. If methane is desired, conditions in chamber 16 will be maintained which favor the growth of methane producing bacteria. Introducing a small amount of air into chamber 16 suppresses the growth of such methane producing bacteria.

Anaerobic treatment followed by aerobic treatment also provides for maximal digestion of contamination at a substantial savings over pure aerobic treatment.

SUMMARY

The process of this invention as discussed above has the following characteristics:

1. An ash-like sludge which is easy to dewater is developed in the upstream chambers due to the relatively high retention time of the sludge.

2. In the upstream chambers the growth of bacteria is promoted under anaerobic conditions, and these bacteria increase in activity as the contamination level rises in the waste water being treated.

3. A floating media is used to which the majority of bacteria adhere.

4. Circulators of the type requiring low energy input are used to circulate water through the media and achieve good contact with the water being treated, the bacteria, and the atmosphere gas.

5. Anaerobic digestion is followed by aerobic digestion.

6. If desired to minimize methane formation in the upstream chambers, trace amounts of oxygen are introduced into these chambers.

7. The anaerobic chambers could be separated by a substantial distance from the aerobic chambers at locations most desirable for treating selected volumes of waste water.

8. Unlike the activated sludge process, conditions need not be carefully controlled because the process tends to be self regulating and requires a minimum of manpower to operate.

9. Enhanced aeration is achieved using the Ryall Circulators in combination with the floating media.

10. If desired, methane may be produced as a by-product energy source which could be used to supplement or supply all the energy needed to operate the plant.

In summation, the use of the Ryall Circulators to achieve intimate contact between the water and bacteria and the use of floating or suspended media provides enhanced COD reduction. The use of recirculating water from the aerobic chamber 18 to the front end of the anaerobic chamber 14 also provides at least two desirable effects. First the water entering chamber 14 has an excess of oxygen which is immediately used up when mixed with the water in chamber 14 and very quick reduction of contamination in the water. Secondly, it brings oxygenated nitrogen into contact with organic carbon to provide denitrification. In some installations one could optimize conditions around this feature to achieve denitrification at levels not ordinarily accomplished in secondary treatment of waste water. This is accomplished without additional facilities for accomplishing denitrification.

The use of the circulators results in rapid separation of the light from the heavy particles. It brings about rapid digestion of the volatile portion organic load leaving the heavy mineral portion in the chamber 14.

In the aerobic chamber 18 electron transfer is involved. The use of the Ryall Circulators enhances this transfer with gases generated during the aerobic digestion process being mixed rapidly with atmospheric gas contacting the bacteria attached to the floating media 42. With enhanced contact there is improved electron transfer and gas diffusion.

The energy used in the process of this invention is an important design consideration. Because the media is suspended by buoyancy rather than pumped aeration as in the case, for example, the activated sludge process, some important advantages are realized. Submerged media of rocks, plastic, etc. have been used by others. In contrast the media 42, having an open structure, does not tend to plug and block the flow of water through it. The amount of growth on the media which would tend to cause blocking is limited since the movement of the media in the water constantly trims back the bacterial matter growing from the media.

On the whole, the process of this invention is relatively slow compared to activated sludge, trickling filters, and biodisc systems. These processes, however, require a large number of mechanical reactor systems that are eliminated with this process. Moreover, they require a great deal of land both for equipment maintenance and sludge handling and drying. For example, a million gallon plant using a conventional activated sludge process will require a minimum of 2 acres of land. The process of this invention of the same capacity will require about ¾ acre of land.

The process of this invention thus creates a better environment for the microorganisms to grow and is sized to permit them sufficient time to digest the pollutants in the waste water.

SCOPE OF THE INVENTION

The above description presents the best mode contemplated for carrying out the present invention as depicted by the preferred embodiment disclosed. The combination of features illustrated by this embodiment provides an improved waste water treating process that can handle shock loads of waste materials and does not generate large quantities of water laden sludge. This invention, however, is susceptible to both modifications and alternate constructions from the embodiment shown in the drawing and disclosed above. Consequently, it is not the intention to limit it to the embodiments disclosed. On the contrary, the intention is to cover all modifications and alternate constructions falling within the scope of this invention as generally expressed by the following claims.

I claim:
1. A process for treating waste water, comprising of:
 (a) passing the water into a first chamber where large diameter solid materials settle from the water and are retained in said first chamber,
 (b) passing water from the first chamber into a second chamber to achieve substantial dilution, said second chamber containing a plurality of gas-water circulators which pump gas from an enclosed surrounding atmosphere into the water and continuously circulate the water in the chamber, with said second chamber being maintained under conditions which favor anaerobic bacterial digestion of waste materials in the water and containing an ash-like sludge,
 (c) introducing trace amounts of oxygen into the second chamber to favor the growth of a small population of microaerophilic bacteria,
 (d) passing water from the second chamber into a third chamber containing a plurality of gas-water circulators which pump gas from the surrounding atmosphere into the water and continuously circulate the water in the chamber, with said third chamber being maintained under conditions which favor anaerobic digestion of organic solids in the water and having floating on the surface of the water in said third chamber a plurality of discrete, highly porous media on which bacteria grow, and
 (e) passing water from the third chamber into a fourth chamber containing a plurality of gas-water circulators which pump gas from the surrounding atmosphere into the water and continuously circulate the water in said chamber, with said fourth chamber being maintained under conditions which favor aerobic digestion of waste materials in the water and having floating on the surface a plurality of discrete, highly porous media on which bacteria grow.

2. The process of claim 1 wherein the water flowing from the second chamber into the third chamber flows through a lamellae chamber, and the water flowing from the third chamber into the fourth chamber flows through a lamellae chamber.

3. The process of claim 2 wherein the fourth chamber is divided into two sections with the water being continuously recycled between section one and section two.

4. The process of claim 3 wherein the gas-water circulators in the fourth chamber are arranged in a manner which provides for the water to flow through the fourth chamber in a carousel-like flow path.

* * * * *